United States Patent [19]  
Ogawa

[11] 4,157,212  
[45] Jun. 5, 1979

[54] LARGE APERTURE MINIATURE WIDE-ANGLE ZOOM LENS SYSTEM
[75] Inventor: Ryota Ogawa, Tsurugashima, Japan
[73] Assignee: Asahi Kogaku Kogyo Kabushiki Kaisha, Tokyo, Japan
[21] Appl. No.: 835,279
[22] Filed: Sep. 21, 1977
[30] Foreign Application Priority Data
  Sep. 22, 1976 [JP] Japan ................. 51-114289
[51] Int. Cl.² ........................................... G02B 15/16
[52] U.S. Cl. .................................................. 350/184
[58] Field of Search ............................... 350/184, 186
[56] References Cited
  FOREIGN PATENT DOCUMENTS
  2557547 7/1976 Fed. Rep. of Germany ........... 350/184

Primary Examiner—Conrad J. Clark
Attorney, Agent, or Firm—Sughrue, Rothwell, Mion, Zinn and Macpeak

[57] ABSTRACT

A large aperture miniature wide-angle zoom lens system is constructed as a two component-type lens system comprising a front lens group which is movable relative to a rear lens group. The front lens group is composed of four lens elements, and the rear lens group is composed of either five or six lens elements. In order from the object side to the image side, the first lens is a positive lens having its surface of greater curvature directed toward the object. The second lens is a negative meniscus lens, and the third lens is a double concave lens. The surfaces of greater curvature of both the second and third lenses are directed toward the image. The fourth lens is a positive lens having its surface of greater curvature directed toward the object. The front lens group composed of the first, second, third and fourth lenses has a negative resultant focal length. The rear lens group has a positive resultant focal length and comprises a double concave lens and first and second positive lens components respectively positioned on the object and image sides of the double concave lens. The first positive lens component includes at least two positive lenses, one of which is a double convex lens. The second positive lens component includes two positive lenses, the surfaces of greater curvature of which are directed toward the image.

2 Claims, 26 Drawing Figures

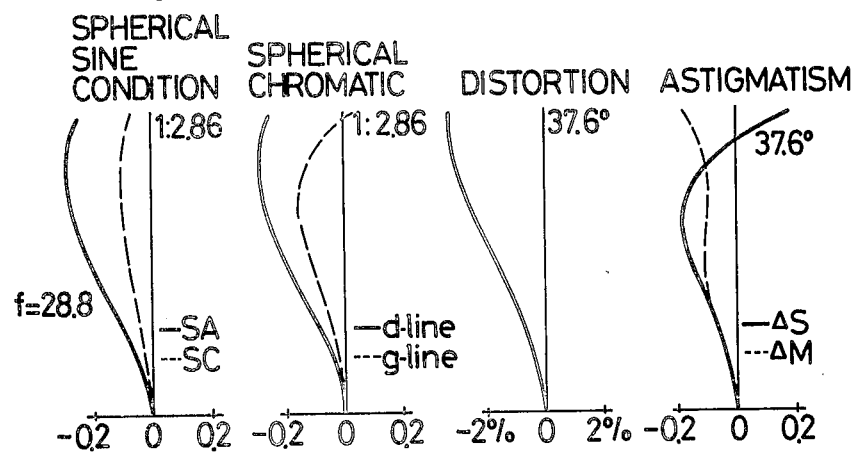
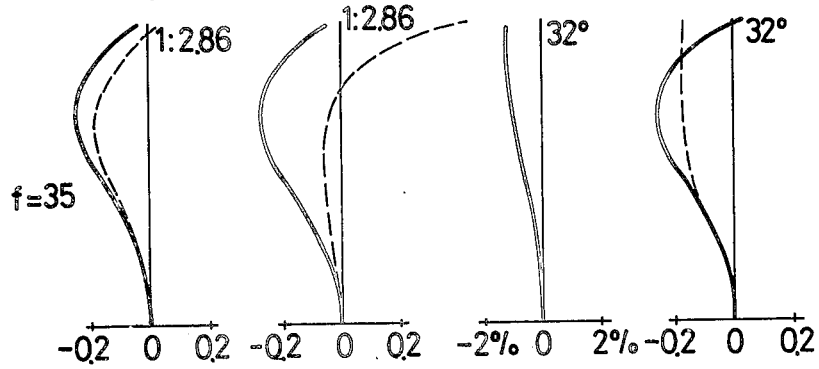
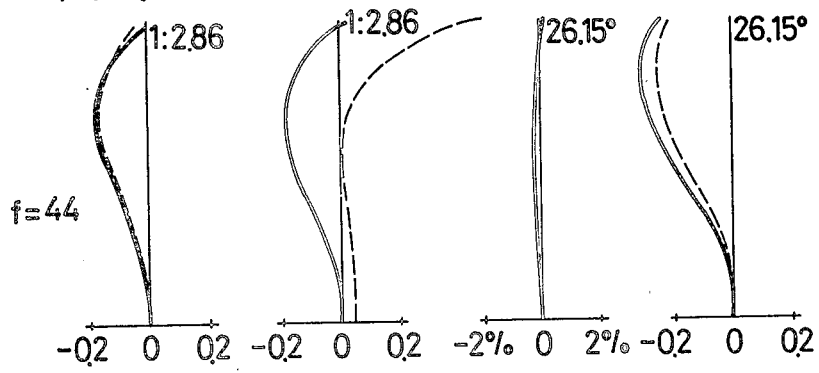

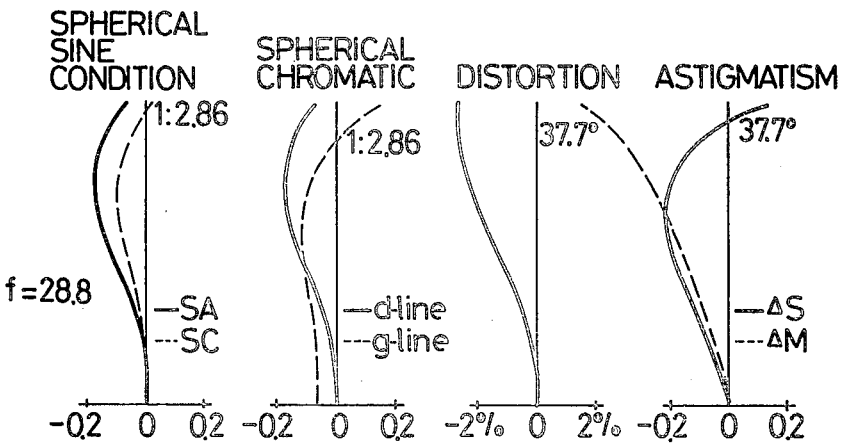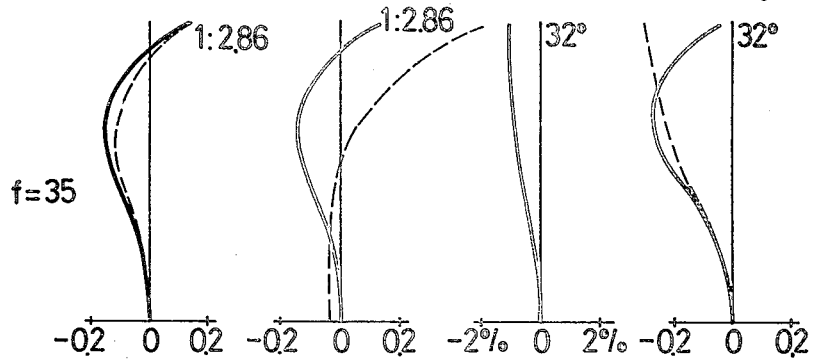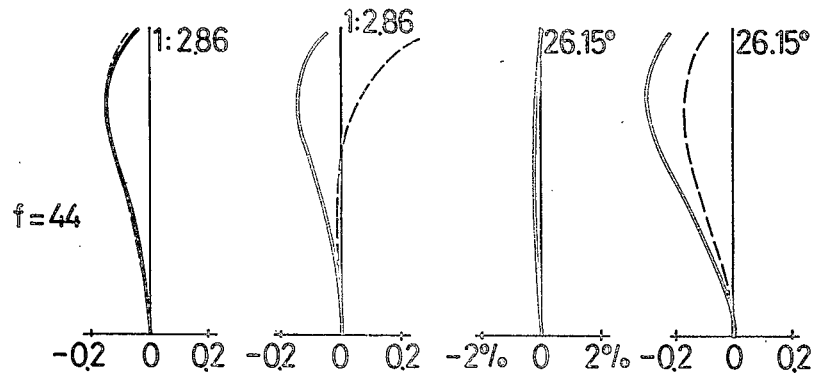

LARGE APERTURE MINIATURE WIDE-ANGLE ZOOM LENS SYSTEM

BACKGROUND OF THE INVENTION

The present invention relates to a wide-angle zoom lens system for a still camera which is small, compact and has a large aperture.

U.S. patent application Ser. No. 794,589, assigned to the assignee of this application and based on Japanese patent application No. 51-52238, disclosed an extremely compact wide-angle zoom lens system which is a so-called two component-type lens system. In this lens system, however, the aperture ratio is at best 1:3.5. With increasing interest in available light photography, there is a demand for faster or brighter lenses, that is larger aperture lenses. If the aperture of the lens system disclosed in U.S. patent application Ser. No. 794,589 were to be increased, the curvatures of the lens surfaces would have to be increased to maintain the compact size of the lens system. Consequently, aberrations of the lens system would be worsened, and this is especially true of the spherical aberration and coma flare in the telescopic range of the lens system.

SUMMARY OF THE INVENTION

It is therefore an object of the present invention to provide a wide-angle zoom lens which is small, compact and has a large aperture without an undesirable increase in aberrations.

The foregoing and other objects of the invention are attained by providing a wide-angle zoom lens system constructed of a front lens group having a negative resultant focal length and a rear lens group having a positive resultant focal length. The front lens group is mechanically displaced relative to the rear lens group to change the magnification of the lens system while maintaining the focal image plane of a constant position. The front lens group is composed of four lens elements, and the rear lens group is composed of either five or six lens elements. In order from the object side to the image side, the first lens is a positive lens having its surface of greater curvature directed toward the object. The second lens is a negative meniscus lens, and the third lens is a double concave lens. The surfaces of greater curvature of both the second and third lenses are directed toward the image. The fourth lens is a positive lens having its surface of greater curvature directed toward the object. The rear lens group comprises a double concave lens and first and second positive lens components respectively positioned on the object and image sides of the double concave lens. The first positive lens component includes at least two positive lenses, one of which is a double convex lens. If only two positive lenses are used, the other lens is a thick positive lens having its surface of greater curvature directed toward the object. Otherwise, two positive lenses having their surfaces of greater curvature directed toward the object are used with the double convex lens. The second positive lens component includes two positive lenses, the surfaces of greater curvature of which are directed toward the image.

The wide-angle zoom lens system according to the present invention is characterized by the following ten conditions as noted below, which will be described in detail hereinafter:

(1) $0.36 < \Delta f_B/(l_S \cdot R) < 0.42$
(2) $3.4 < f_{1.2}/|F_a| < 4.5$
(3) $0.5 < f_4/F_a < 0.65$
(4) $1.7 < f_{6.7}/|F_a| < 2.6$
(5) $1.4 < r_{10}/F_b < 2.6$
(6) $-2.5 < r_a/F_b < -1.3$
(7) $-0.85 < r_b/F_b < -0.55$
(8) $0.8 < r_c/F_b < 1.4$
(9) $0.6 < r_d/F_b < 1.0$
(10) $1.75 < n$ where
$F_a$ is the focal length of the front lens group,
$F_b$ is the focal length of the rear lens group,
$f_{1.2}$ is the focal length of the first lens in the front lens group,
$f_4$ is the focal length of the image side surface of the second lens,
$f_{6.7}$ is the focal length from the image side surface of the third lens through the object side surface of the fourth lens,
$r_{10}$ is the radius of curvature of the surface facing the image of the double convex lens nearest to the image in the rear lens group,
$r_a$ is the radius of curvature of the object side surface of the double concave lens in the rear lens group,
$r_b$ is the radius of curvature of the image side surface of the double concave lens in the rear lens group,
$r_c$ is the radius of curvature of the image side surface of the positive lens positioned immediately after the double concave lens,
$r_d$ is the radius of curvature of the image side surface of the positive lens positioned secondly after the double concave lens,
n is the refractive index of the double concave lens in the rear lens group (shown by d-line),
$l_S$ is the length of the space between the front lens group and the rear lens group in the most wide-angle end of the zoom range,
R is the magnification variation ratio, and
$\Delta f_B$ is the moving length of the rear lens group during magnification variation.

BRIEF DESCRIPTION OF THE INVENTION

The invention will be described in more detail with reference to the accompanying drawings, in which FIG. 1 is a simplified cross-sectional view of a first exmaple of a lens system constructed in accordance with the invention;

FIGS. 2A, 2B and 2C are aberration curves showing spherical aberration and sine condition, FIGS. 2D, 2E and 2F are aberration curves showing spherical and chromatic aberrations, FIGS. 2G, 2H and 2I are aberration curves showing distortion, and FIGS. 2J, 2K and 2L are aberration curves showing astigmatism of the lens system of the first example shown in FIG. 1 of focal lengths of 28.8 mm, 35 mm and 44 mm, respectively;

FIG. 3 is a simplified cross-sectional view of a second example of a lens system constructed in accordance with the invention; and FIGS. 4A, 4B and 4C are aberration curves showing spherical aberration and sine condition, FIGS. 4D, 4E and 4F are aberration curves showing spherical and chromatic aberrations, FIGS. 4G, 4H and 4I are aberration curves showing distortion, and FIGS. 4J, 4K and 4L are aberration curves showing astigmatism of the lens system of the second example shown in FIG. 3 of focal lengths of 28.8 mm, 35 mm and 44 mm, respectively.

DETAILED DESCRIPTION OF THE INVENTION

Figure 1:
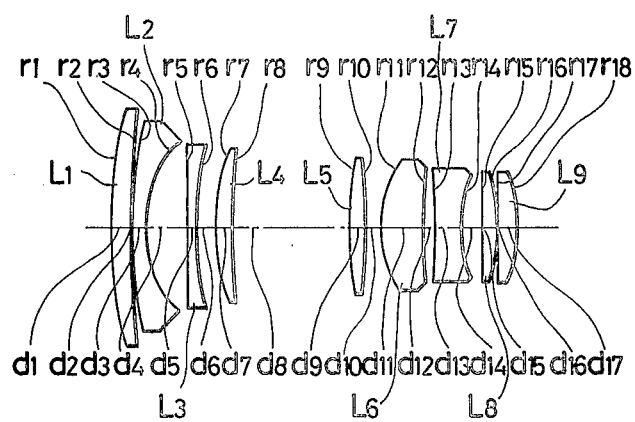

In order to construct a large aperture miniature wide-angle zoom lens according to the invention, each of the conditions (1) to (10) set fourth hereinabove must be satisfied.

The condition (1) defines the basic construction or arrangement of the zoom lens system and defines the relation of the length of the space between the front lens group and the rear lens group at the most wide-angle $l_s$ end of the zoom range, the magnification variation R and the amount of the movement of the rear lens group $\Delta f_B$ for the purpose of obtaining sufficient brightness with miniaturization.

When the value of $f_B/(l_s \cdot R)$ exceeds the maximum limited value 0.42, miniaturization of the lens system, and especially the front lens group, is easily achieved. However, in order to obtain appropriate magnification variation, the shifting length of the rear lens group is elongated. In the telescopic zoom range, the width of the incident light flux to the negative lenses in the rear lens group is widened. As a result, the spherical aberration and the coma aberration are inevitably worsened.

When the value of $f_B/(l_s \cdot R)$ becomes less than the minimum limited value 0.36, the shifting length of the rear lens group is shortened, and instead, the power of the front lens group is weakened so that the shifting length of the front lens group is elongated, and in the most wide-angle end of the zoom range, the peripheral light flux is extremely positioned, separating from the optical axis. Therefore, this result is disadvantageous for miniaturization, and under such condition it is difficult to utilize the peripheral light sufficiently and maintain good compensation of various aberrations. It is difficult to provide a fast or bright lens system and maintain the light balance in the image plane well.

The condition (1) and the conditions (2) to (9) assist each other. The conditions (2) to (9) are required to satisfy the condition (1) and at the same time to maintain the aberration compensations within desirable ranges. The conditions (2), (3), (4) are required for the front lens group to miniaturize the lens system and at the same time to maintain the aberration balance good in the magnification variation range.

The condition (2) is required to compensate for the distortion in the wide-angle range and at the same time to miniaturize the lens system. If the value of $f_{1.2}/|F_a|$ exceeds the maximum limited value 4.5, these features are not accomplished. If the value of $f_{1.2}/|F_a|$ becomes less than 3.4 in the wide-angle range, image plane distortion becomes under-value, and for the purpose of compensation for this under-value, it is required for example to enhance the power of the surface facing the image of the second lens. This requirement and the compensation for the spherical aberration in the telescopic range of the zoom lens system are contrary to each other.

Above the maximum limited value of the condition (3) it is impossible to completely compensate for the coma aberration in the most wide-angle range of the zoom lens system, and the total power of the front lens group is weakened. This result does not satisfy condition (1) in that it does not permit miniaturizing the lens system.

Below the minimum limited value of the condition (3), $f_4$ becomes too small with the result that the lens system can not have a wide view angle. The spherical aberration generated therein becomes over-value. It is extremely difficult to compensate for this aberration in the other lenses. The minimum limited value of the condition (3) can be small when the F-Number is small, that is the lens system is relatively slow or dark as for example an F-Number less than 1/3.5. However, in order to obtain a fast or bright lens system, it is suitable to set the value of $f_4/F_a$ between the range shown by condition (3).

The condition (4) is required to maintain the spherical aberration and the coma aberration at a desirable value in the telescopic range of the zoom lens and to maintain the other aberrations within acceptable limits throughout the entire zoom range. That is, the function of the surface facing the object of the fourth lens is to compensate for great over-value of the spherical aberration generated in the surface facing the image of the second lens and the third lens especially in the telescopic zoom range. This makes it possible to increase the negative power of entire the front lens group which is important for the miniaturization of the overall lens system. Therefore, exceeding the maximum limited value of the condition (4) means that the compensation effect of the great positive power of the fourth lens is degraded. In contrast, when $f_{6,7}/F_a$ is below the minimum limited value of the condition (4), the aberration generated in the surface facing the image of the third lens and the aberration generated in the surface facing the object of the fourth lens, though they tend to off set each other, are too strong to balance. Therefore, the spherical aberration and the coma aberration especially in the telescopic zoom range are degraded.

The conditions (1), (2), (3) and (4) of the present invention partially overlap the conditions (1), (2), (3) and (4) of the aforementioned U.S. application Ser. No. 794,589. However, in order to attain a fast or bright lens system having a better performance, it is necessary to also satisfy the following conditions (5), (6), (7), (8), (9) and (10) with respect to the rear lens group. Also, while the conditions (5), (6), (7), (8), (9) and (10) partially overlap the conditions set forth in the aforementioned U.S..application Ser. No. 794,589, unless all the conditions of the present invention are simultaneously satisfied, it is impossible to obtain the lens system to which the present invention is directed.

The condition (5) is effective to compensate for the distortion in the most wide-angle zoom range in the positive direction. The first lens of the rear lens group is positioned at the middle portion of the lens system in the most wide-angle range. The distortion aberration is critically determined by the selection of the position of the diaphragm. However, in order to prevent coma flare in the most wide-angle range from being generated in the surfaces facing the image of the rear lens group and in order to position the diaphragm relatively near to the image plane, in the surface facing the image of the first lens of the rear lens group it is effective to compensate for the distortion aberration in the most wide-angle range in the positive direction.

The condition (5) is required to effectively compensate the effect described above. That is, exceeding the maximum limited value means that the effective compensation for distortion is not obtained. In contrast, a value under the minimum limited value means that the image distortion in the entire magnification variation range becomes undervalue, for the purpose of the compensation for this aberration, and it becomes necessary to enhance the power of the negative surfaces facing the object of the negative lenses in the rear lens group. For this reason, it is difficult to compensate for the spherical aberration generated by the other lenses.

The conditions (6) and (7) relate to the radii of curvature of a front or rear sufaces of the double concave lens in the rear lens group and are required to desirably balance the spherical aberration and the coma aberration in the overall magnification variation range. That is, though the amount of the movement of the rear lens group is defined by the condition (1), due to the movement the aberrations generated by the refractive force at each focal length are varied, and since the lens system is fast or bright, the amount of the aberrations are relatively large. Both of the conditions (1) and (7) are required to maintain the spherical aberration generated in the double concave lens of the rear lens group to such extent that it is possible to off set the spherical aberration by the other lenses, and at the same time, the left coma aberration from the first lens of the front lens group through the double concave lens in the rear lens group is compensated for and balanced.

Above the maximum limited value of the condition (6), since the radius of curvature of the surface facing the object of the double concave lens in the rear lens group is small, the spherical aberration and the inside coma aberration increases in the overall magnification variation. Below the minimum limited value, it is insufficient to compensate for the coma aberration generated up to the double concave lens in the rear lens group, and the negative power decreases in connection with the condition (7). This leads to a decrease in the Petzval's sum and is disadvantageous for the miniaturization of the lens system.

Above the maximum limited value of the condition (7), the spherical aberration increase in the telescopic range and the outside coma aberration also increases in the overall range of the magnification variation. Below the minimum limited value of the condition, the negative power decreases too much in connection with the condition (6) and especially the effect to compensate for the distortion in the most wide-angle range in the positive direction is degraded.

The conditions (8) and (9) relate to the radii of curvature of the surfaces, facing the image, of the two positive lenses and are required to compensate for the spherical aberration in the overall range of the magnification variation in connection with the conditions (6) and (7). Above both of the maximum limited values, the spherical aberration cannot be off set. Below both of the minimum limited values of the conditions (6) and (7), inversely, the spherical aberration in the telescopic range becomes under-value.

The condition (10) satisfies the conditions (6) and (7) and at the same time is required to maintain the negative power of the rear lens group at a great value. By satisfaction of the minimum limited value of the condition (10), it is not necessary to decrease the radii of curvature of the surfaces facing the image of the negative lenses. For this reason, it is possible to provide a fast or bright lens system.

The invention will be illustrated in more particularity with reference to two examples which are illustrated in the drawings. With reference to FIG. 1 which shows a simplified cross-sectional view of the first example, the front lens group comprises the lenses $L_1$, $L_2$, $L_3$ and $L_4$. $L_1$ is a positive lens, $L_2$ is a negative meinscus lens, $L_3$ is a double concave lens, and $L_4$ is a positive lens. The rear lens group is composed of five lenses, and more particularly a double concave lens $L_7$ with positive lenses disposed on either side thereof. The positive lenses on the object side of the double concave lens $L_7$ are a double convex lens $L_5$ and a thick positive lens $L_6$. The positive lenses on the image side of lens $L_7$ are the lenses $L_8$ and $L_9$. In this example, $r_a = r_{13}$, $r_b = r_{14}$, $r_c = r_{16}$ and $r_d = r_{18}$.

EXAMPLE 1

Aperture Ratio 1:2.86
Focal Length f=28.8 ~ 35.0 ~ 44.0
Angle of View 2ω=75.2° ~ 64.0° ~ 52.3°

| Lens | Radius of Curvature | Thickness or Spacing | Index of Refraction | Abbé Number |
|---|---|---|---|---|
| $L_1$ | $r_1 = 73.187$ | $d_1 = 3.60$ | $n_1 = 1.58913$ | $\nu_1 = 61.1$ |
|  | $r_2 = 339.741$ | $d_2 = 0.10$ |  |  |
| $L_2$ | $r_3 = 90.633$ | $d_3 = 1.60$ | $n_2 = 1.80610$ | $\nu_2 = 40.9$ |
|  | $r_4 = 19.167$ | $d_4 = 7.46$ |  |  |
| $L_3$ | $r_5 = -400.000$ | $d_5 = 1.60$ | $n_3 = 1.64000$ | $\nu_3 = 60.2$ |
|  | $r_6 = 49.487$ | $d_6 = 3.26$ |  |  |
| $L_4$ | $r_7 = 34.000$ | $d_7 = 3.00$ | $n_4 = 1.80518$ | $\nu_4 = 25.4$ |
|  | $r_8 = 94.650$ | $d_8 = 19.829$ ~10.707 ~2.040 |  |  |
| $L_5$ | $r_9 = 81.015$ | $d_9 = 3.00$ | $n_5 = 1.77250$ | $\nu_5 = 49.7$ |
|  | $r_{10} = -66.820$ | $d_{10} = 2.03$ |  |  |
| $L_6$ | $r_{11} = 21.500$ | $d_{11} = 7.00$ | $n_6 = 1.65844$ | $\nu_6 = 50.9$ |
|  | $r_{12} = 94.396$ | $d_{12} = 1.99$ |  |  |
| $L_7$ | $r_{13} = -62.900$ | $d_{13} = 4.28$ | $n_7 = 1.84666$ | $\nu_7 = 23.9$ |
|  | $r_{14} = 21.928$ | $d_{14} = 3.59$ |  |  |
| $L_8$ | $r_{15} = -350.000$ | $d_{15} = 2.60$ | $n_8 = 1.58267$ | $\nu_8 = 46.4$ |
|  | $r_{16} = -31.044$ |  |  |  |

EXAMPLE 1-continued

Aperture Ratio 1:2.86
Focal Length f=28.8 ~ 35.0 ~ 44.0
Angle of View 2ω=75.2° ~ 64.0° ~ 52.3°

| Lens | Radius of Curvature | Thickness or Spacing | Index of Refraction | Abbé Number |
|------|---------------------|----------------------|---------------------|-------------|
|      |                     | $d_{16} = 0.10$      |                     |             |
| $L_9$ | $r_{17} = -250.000$ | $d_{17} = 3.16$     | $n_9 = 1.51633$     | $\nu_9 = 64.1$ |
|      | $r_{18} = -28.889$  |                      |                     |             |

$F_a = -43.732$
$F_b = 33.912$
$f_{1,2} = 157.549$
$f_4 = -23.777$
$f_{6,7} = 85.124$ $l_s = 19.829$
$\Delta f_B = 11.787$
$R = 1.528$ FIGS. 2A to 2L show the aberration curves for the example shown in FIG. 1 at various focal lengths within the zoom range.

Figure 3:
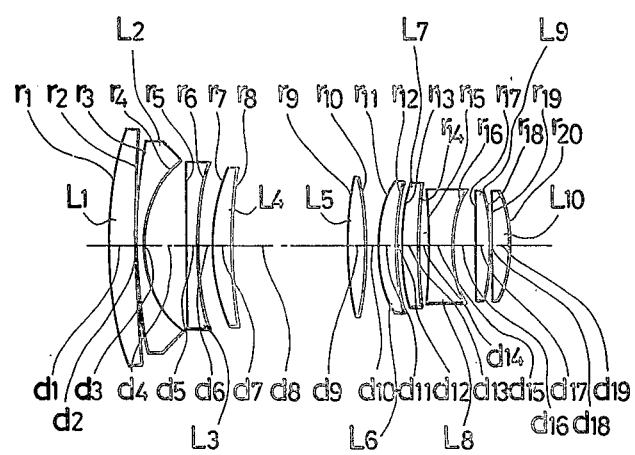

Referring now to FIG. 3, a second example is shown. The second example differs from the first example primarily in the substitution of two positive lenses $L_6$ and $L_7$ for the single thick positive lens $L_6$ of FIG. 1. In this second example, $r_a = r_{15}$, $r_b = r_{16}$, $r_c = r_{18}$ and $r_d = r_{20}$.

EXAMPLE 2

Aperture Ratio 1:2.86
Focal Length f=28.8 ~ 35.0 ~ 44.0
Angle of View 2ω=75.4° ~ 64.0° ~ 52.3°

| Lens | Radius of Curvature | Thickness or Spacing | Index of Refraction | Abbé Number |
|------|---------------------|----------------------|---------------------|-------------|
| $L_1$ | $r_1 = 75.683$     | $d_1 = 3.50$         | $n_1 = 1.58913$     | $\nu_1 = 61.1$ |
|      | $r_2 = 338.844$     | $d_2 = 0.10$         |                     |             |
| $L_2$ | $r_3 = 87.044$     | $d_3 = 1.60$         | $n_2 = 1.80610$     | $\nu_2 = 40.9$ |
|      | $r_4 = 19.287$      | $d_4 = 7.52$         |                     |             |
| $L_3$ | $r_5 = -346.012$   | $d_5 = 1.60$         | $n_3 = 1.63854$     | $\nu_3 = 55.4$ |
|      | $r_6 = 50.380$      | $d_6 = 3.44$         |                     |             |
| $L_4$ | $r_7 = 33.891$     | $d_7 = 3.00$         | $n_4 = 1.80518$     | $\nu_4 = 25.4$ |
|      | $r_8 = 91.382$      | $d_8 = 19.379$ ~10.1427 ~1.3672 | |         |
| $L_5$ | $r_9 = 84.091$     | $d_9 = 3.00$         | $n_5 = 1.77250$     | $\nu_5 = 49.7$ |
|      | $r_{10} = -66.231$  | $d_{10} = 2.03$      |                     |             |
| $L_6$ | $r_{11} = 22.400$  | $d_{11} = 2.90$      | $n_6 = 1.77250$     | $\nu_6 = 49.7$ |
|      | $r_{12} = 39.960$   | $d_{12} = 1.51$      |                     |             |
| $L_7$ | $r_{13} = 36.477$  | $d_{13} = 2.40$      | $n_7 = 1.51633$     | $\nu_7 = 64.1$ |
|      | $r_{14} = 90.848$   | $d_{14} = 2.00$      |                     |             |
| $L_8$ | $r_{15} = -61.633$ | $d_{15} = 4.27$      | $n_8 = 1.84666$     | $\nu_8 = 23.9$ |
|      | $r_{16} = 22.259$   | $d_{16} = 3.56$      |                     |             |
| $L_9$ | $r_{17} = -336.917$| $d_{17} = 2.60$      | $n_9 = 1.62045$     | $\nu_9 = 38.1$ |
|      | $r_{18} = -34.268$  | $d_{18} = 0.10$      |                     |             |
| $L_{10}$ | $r_{19} = -384.302$ | $d_{19} = 3.16$  | $n_{10} = 1.51633$  | $\nu_{10} = 64.1$ |
|      | $r_{20} = -27.879$  |                      |                     |             |

$F_a = -43.961$
$F_b = 34.141$
$f_{1,2} = 164.560$
$f_4 = -23.926$
$f_{6,7} = 82.515$ $l_s = 19.379$
$\Delta f_B = 11.802$
$R = 1.528$ FIGS. 4A to 4L show the aberration curves for the example shown in FIG. 3 at various focal lengths within the zoom range.

What is claimed is:

1. A large aperture miniature wide-angle zoom lens system constructed in two components comprising a front lens group which is relatively movable with respect to a rear lens group, said front lens group being composed of four lens elements and said rear lens group being composed of five lens elements, said lens elements in order from the object side to the image side being a positive lens $L_1$, a negative meniscus lens $L_2$, a double concave lens $L_3$, a positive lens $L_4$, a double convex lens $L_5$, a thick positive lens $L_6$, a double concave lens $L_7$ and two positive lenses $L_8$ and $L_9$, the radii of curvature $r_1$ to $r_{18}$, the thicknesses or separations $d_1$ to $d_{17}$, the refractive indicies $n_1$ to $n_9$ and the Abbé numbers $\nu_1$ to $\nu_9$ satisfying the following conditions:

Aperture Ratio 1:2.86
Focal Length $f = 28.8 \sim 44.0$
Angle of View $2\omega = 75.2° \sim 52.3°$

| Lens | Radius of Curvature | Thickness or Spacing | Index of Refraction | Abbé Number |
|---|---|---|---|---|
| $L_1$ | $r_1 = 73.187$ | | | |
| | | $d_1 = 3.60$ | $n_1 = 1.58913$ | $\nu_1 = 61.1$ |
| | $r_2 = 339.741$ | | | |
| | | $d_2 = 0.10$ | | |
| $L_2$ | $r_3 = 90.633$ | | | |
| | | $d_3 = 1.60$ | $n_2 = 1.80610$ | $\nu_2 = 40.9$ |
| | $r_4 = 19.167$ | | | |
| | | $d_4 = 7.46$ | | |
| $L_3$ | $r_5 = -400.000$ | | | |
| | | $d_5 = 1.60$ | $n_3 = 1.64000$ | $\nu_3 = 60.2$ |
| | $r_6 = 49.487$ | | | |
| | | $d_6 = 3.26$ | | |
| $L_4$ | $r_7 = 34.000$ | | | |
| | | $d_7 = 3.00$ | $n_4 = 1.80518$ | $\nu_4 = 25.4$ |
| | $r_8 = 94.650$ | | | |
| | | $d_8 = 19.829 \sim 2.040$ (variable) | | |
| $L_5$ | $r_9 = 81.015$ | | | |
| | | $d_9 = 3.00$ | $n_5 = 1.77250$ | $\nu_5 = 49.7$ |
| | $r_{10} = -66.820$ | | | |
| | | $d_{10} = 2.03$ | | |
| | $r_{11} = 21.500$ | | | |

-continued

Aperture Ratio 1:2.86
Focal Length $f = 28.8 \sim 44.0$
Angle of View $2\omega = 75.2° \sim 52.3°$

| Lens | Radius of Curvature | Thickness or Spacing | Index of Refraction | Abbé Number |
|---|---|---|---|---|
| $L_6$ | | $d_{11} = 7.00$ | $n_6 = 1.65844$ | $\nu_6 = 50.9$ |
| | $r_{12} = 94.396$ | | | |
| | | $d_{12} = 1.99$ | | |
| $L_7$ | $r_{13} = -62.900$ | | | |
| | | $d_{13} = 4.28$ | $n_7 = 1.84666$ | $\nu_7 = 23.9$ |
| | $r_{14} = 21.928$ | | | |
| | | $d_{14} = 3.59$ | | |
| $L_8$ | $r_{15} = -350.000$ | | | |
| | | $d_{15} = 2.60$ | $n_8 = 1.58267$ | $\nu_8 = 46.4$ |
| | $r_{16} = -31.044$ | | | |
| | | $d_{16} = 0.10$ | | |
| $L_9$ | $r_{17} = -250.000$ | | | |
| | | $d_{17} = 3.16$ | $n_9 = 1.51633$ | $\nu_9 = 64.1$ |
| | $r_{18} = -28.889$ | | | |

2. A large aperture miniature wide-angle zoom lens system constructed in two components comprising a front lens group which is relatively movable with respect to a rear lens group, asid front lens group being composed of four lens elements and said rear lens group being composed of six lens elements, said lens elements in order from the object side to the image side being a positive lens $L_1$, a negative meniscus lens $L_2$, a double concave lens $L_3$, a positive lens $L_4$, a double convex lens $L_5$, two positive lenses $L_6$ and $L_7$, a double concave lens $L_8$, and two positive lenses $L_9$ and $L_{10}$, the radii of curvature $r_1$ to $r_{20}$, the thicknesses or separations $d_1$ to $d_{19}$, the refractive indicies $n_1$ to $n_{10}$ and the Abbé numbers $\nu_1$ to $\nu_{10}$ satisfying the following conditions:

Aperture Ratio 1:2.86
Focal Length $f = 28.8 \sim 44.0$
Angle of View $2\omega = 75.4° \sim 52.3°$

| Lens | Radius of Curvature | Thickness or Spacing | Index of Refraction | Abbé Number |
|---|---|---|---|---|
| $L_1$ | $r_1 = 75.683$ | | | |
| | | $d_1 = 3.50$ | $n_1 = 1.58913$ | $\nu_1 = 61.1$ |
| | $r_2 = 338.844$ | | | |
| | | $d_2 = 0.10$ | | |
| $L_2$ | $r_3 = 87.044$ | | | |
| | | $d_3 = 1.60$ | $n_2 = 1.80610$ | $\nu_2 = 40.9$ |
| | $r_4 = 19.287$ | | | |
| | | $d_4 = 7.52$ | | |
| $L_3$ | $r_5 = -346.012$ | | | |
| | | $d_5 = 1.60$ | $n_3 = 1.63854$ | $\nu_3 = 55.4$ |
| | $r_6 = 50.380$ | | | |
| | | $d_6 = 3.44$ | | |
| $L_4$ | $r_7 = 33.891$ | | | |
| | | $d_7 = 3.00$ | $n_4 = 1.80518$ | $\nu_4 = 25.4$ |
| | $r_8 = 91.382$ | | | |
| | | $d_8 = 19.379 \sim 1.3672$ (variable) | | |
| $L_5$ | $r_9 = 84.091$ | | | |
| | | $d_9 = 3.00$ | $n_5 = 1.77250$ | $\nu_5 = 49.7$ |
| | $r_{10} = -66.231$ | | | |
| | | $d_{10} = 2.03$ | | |
| $L_6$ | $r_{11} = 22.400$ | | | |
| | | $d_{11} = 2.90$ | $n_6 = 1.77250$ | $\nu_6 = 49.7$ |
| | $r_{12} = 39.960$ | | | |
| | | $d_{12} = 1.51$ | | |
| $L_7$ | $r_{13} = 36.477$ | | | |
| | | $d_{13} = 2.40$ | $n_7 = 1.51633$ | $\nu_7 = 64.1$ |
| | $r_{14} = 90.848$ | | | |
| | | $d_{14} = 2.00$ | | |
| $L_8$ | $r_{15} = -61.633$ | | | |
| | | $d_{15} = 4.27$ | $n_8 = 1.84666$ | $\nu_8 = 23.9$ |
| | $r_{16} = 22.259$ | | | |
| | | $d_{16} = 3.56$ | | |
| $L_9$ | $r_{17} = -336.917$ | | | |
| | | $d_{17} = 2.60$ | $n_9 = 1.62045$ | $\nu_9 = 38.1$ |
| | $r_{18} = -34.268$ | | | |
| | | $d_{18} = 0.10$ | | |
| $L_{10}$ | $r_{19} = -384.302$ | | | |
| | | $d_{19} = 3.16$ | $n_{10} = 1.51633$ | $\nu_{10} = 64.1$ |
| | $r_{20} = -27.879$ | | | |

* * * * *